(12) United States Patent
Brachet et al.

(10) Patent No.: US 7,399,177 B2
(45) Date of Patent: Jul. 15, 2008

(54) STRETCH-BLOW MOLDING MACHINE WITH MECHANICALLY CONTROLLED STRETCH ROD

(75) Inventors: Vincent Brachet, Octeville sur Mer (FR); Stéphane Legallais, Octeville sur Mer (FR)

(73) Assignee: Sidel Participations, Octeville sur Mer (FR)

( * ) Notice: Subject to any disclaimer, the term of this patent is extended or adjusted under 35 U.S.C. 154(b) by 214 days.

(21) Appl. No.: 10/582,777

(22) PCT Filed: Oct. 25, 2004

(86) PCT No.: PCT/FR2004/002738

§ 371 (c)(1),
(2), (4) Date: Jul. 6, 2006

(87) PCT Pub. No.: WO2005/068160

PCT Pub. Date: Jul. 28, 2005

(65) Prior Publication Data

US 2007/0148276 A1 Jun. 28, 2007

(30) Foreign Application Priority Data

Dec. 17, 2003 (FR) .................................. 03 14820

(51) Int. Cl.
*B29C 49/12* (2006.01)

(52) U.S. Cl. ...................................... 425/529; 425/540
(58) Field of Classification Search ................. 425/529, 425/540
See application file for complete search history.

(56) References Cited

U.S. PATENT DOCUMENTS

| 3,977,822 A | 8/1976 | Reilly et al. |
| 3,999,927 A | 12/1976 | Kellogg |
| 4,036,573 A * | 7/1977 | Kauffman et al. ........... 425/529 |
| 4,141,680 A | 2/1979 | Kauffman et al. |
| 6,722,868 B1 * | 4/2004 | Evrard ........................ 425/3 |
| 2004/0009254 A1 * | 1/2004 | Galloni ...................... 425/529 |

* cited by examiner

*Primary Examiner*—Robert B Davis
(74) *Attorney, Agent, or Firm*—Sughrue Mion, PLLC

(57) ABSTRACT

A rotary machine for producing recipients made of a thermoplastic material by drawing and blowing performs by a molding device which is provided with an openable mold and a movable drawing rod, a device for supporting and driving the drawing rod, which is embodied in such a way that it is mechanical and includes a power take-off device for generating, on the basis of a monodirectional rotary rotation, two rotary motions of given angular amplitudes of a rocker in two predetermined angular places of a merry-go-round path and a device for converting the two rotary movements of the rocker into two opposite linear alternately descending and ascending displacements of a drive unit connected to the drawing rod.

6 Claims, 4 Drawing Sheets

STRETCH-BLOW MOLDING MACHINE WITH MECHANICALLY CONTROLLED STRETCH ROD

FIELD OF THE INVENTION

The invention relates to the field of machines for producing containers made of thermoplastic by stretching and blow molding a preform which is produced beforehand by injection molding. These machines are used in particular to produce containers, such as bottles, from polyethylene terephthalate (PET).

In such a machine, substantially tubular preforms are used, which are closed at one of their axial ends and of which the other axial end is open and already has the final shape of the neck of the final container.

Each preform is heated in a thermal conditioning oven to heat the body of the preform to a temperature above the glass transition temperature of the thermoplastic. The preform thus conditioned is transferred to a blowing mold in which a cavity in the shape of the container to be obtained is bounded. The preform is arranged in the mold so that its open end extends outside the mold. Thus, a blow molding device can be conveyed to the neck of the preform in order to inject pressurized air into the preform. Simultaneously, a stretch rod is introduced axially into the preform so as to bear against the closed end at the bottom of the preform. The stretch rod thereby serves to efficiently control the axial deformation of the preform during the blow molding of the container.

The invention can be implemented more particularly in a stretch-blow molding machine of rotary type comprising several molding devices mounted on the periphery of a turntable which is continuously rotated about its axis. Each molding device comprises in particular an openable mold, a blow molding device and a stretching device.

DESCRIPTION OF THE PRIOR ART

According to a known design, the movement of the stretch rod is controlled by a pneumatic cylinder which supplies the power necessary for the movement of the rod, but the stretching rate is controlled by a roller and cam device which serves to perfectly synchronize the axial position of the stretch rod according to the angular position of the blow molding station concerned about the axis of rotation of the turntable.

These systems, widely developed today, provide full satisfaction in terms of the operation of the blow molding process.

However, the known systems have a high total power consumption. In fact, one of the main factors in the power consumption of the machines concerned consists of the pressurized air which is commonly employed for miscellaneous functions. These include the pneumatic control of the cylinders actuating the stretch rod of each blow molding station, which must be supplied with pressurized air both for lowering and for raising the rod.

Solutions have certainly already been proposed to try to reduce the consumption of pressurized air necessitated by the actuation of the stretch rod, for example, by actuating the pneumatic cylinder only for the lowering of the stretch rod and by causing the rod to rise under the action of the blowing pressure prevailing in the container at the end of the blow molding process (document FR-2 814 392).

The pure and simple elimination of the pneumatic control of the stretch rod has also been considered, and its replacement by a magnetic control system (document FR-2 798 093).

However, these attempts have not proved advantageous, and in most present day machines, the stretch rod continues to be actuated pneumatically, both for lowering and for raising.

SUMMARY OF THE INVENTION

It is therefore an object of the invention to propose an improved but simple solution which leads to a total eradication of the pneumatic control of the stretch rods and which consequently leads to a smaller pneumatic installation within the machine.

For these purposes, the invention proposes a machine for producing containers made of a thermoplastic by stretching and blow molding preforms, this machine comprising a continuously rotating turntable supporting at least one molding device comprising an openable mold and a stretch rod which can be sequentially moved, by support and driving means, along the axis of the mold to stretch the preform during the container production operation, which machine, being designed according to the invention, is characterized in that the means for supporting and driving the stretch rod are mechanical means which comprise:

power takeoff means functionally associated with said turntable and able to generate, based on the continuous unidirectional rotation of the turntable, two rotary movements of given angular amplitudes of a rocker occurring at two respective predetermined angular locations of the circular route of the turntable, and movement conversion means able to convert said two rotary movements of given angular amplitudes of the rocker into two alternately descending and ascending opposite linear movements of a drive member along a route substantially parallel to the axis of the mold, said drive member being connected to the stretch rod.

The invention is based on the simple but hitherto unexploited fact that the rotating turntable represents a source of movement from which it is possible, by purely mechanical means, to derive the movements necessary to actuate the stretch rods. This addition of auxiliary movements obviously has repercussions on the rotary drive of the turntable, and it is accordingly necessary to provide motor drive means dimensioned commensurately. However, the additional electric power required for the proper drive of the turntable remains minor compared to the cost of the pneumatic installation for driving all the stretch rods (in particular, the air compressor becomes less powerful, hence smaller and less costly).

In a preferred embodiment due to its structural simplicity, the power takeoff means comprise:

fixed cam means extending at least in a circular arc, and advantageously circular, and coaxial with the turntable, having at least two bosses at the respective predetermined locations for controlling the movements of the stretch rod, and a rocker with at least one idler roller supported in a freely rotating manner about a vertical axis by the turntable and driven thereby along the cam means, the rocker being able to be rotated over a predetermined angular range when the idler roller passes each boss of the cam means.

In this case, a practical example of implementation consists in that:

the cam means comprise two superimposed fixed cams, these cams comprising, for said each predetermined location, two respective bosses arranged angularly offset to one another, and the rocker comprises two pairs of two idler rollers, vertically offset to one another for respectively cooperating with said two cams, this rocker comprising two arms in the form of a cross integral with each other and supporting said rollers at their respective ends, the axis of rotation of the rocker coinciding with the intersection of said two arms, whereby, at each of the abovementioned predetermined locations, the rocker, by passing over the two successive bosses of the cam means, rotates by 180°.

In a concrete exemplary embodiment, said cams comprise respective cam surfaces which are cylinders of revolution and coaxial with the axis of the turntable and the rocker is moved within the cylindrical space bounded by the cams.

Also in a simple manner, the movement conversion means can then be arranged to comprise:

a caliper formed from two arms hinged freely by one of their respective ends, these two arms being arranged in a substantially vertical plane, the first of these arms having its other end hinged freely at a fixed point of the turntable and the second of these arms having its other end hinged on a slide mounted on a guide parallel to the mold axis, said slide supporting said stretch rod, and a drive rod having a first of its ends made integral, via a rotary hinge with three degrees of freedom, with a rotary arm integral with the axis of the rocker and having its other end connected via a rotary hinge with three degrees of freedom to said first arm of said caliper.

According to the desired purpose, the arrangements according to the invention make it possible to completely eliminate the pneumatic actuation of the stretch rods, which is replaced by a totally mechanical drive actuated by the rotation of the turntable.

BRIEF DESCRIPTION OF THE DRAWINGS

The invention will be better understood from a reading of the detailed description that follows of certain embodiments provided exclusively as nonlimiting examples. In this description, reference is made to the drawings appended hereto in which.

DETAILED DESCRIPTION OF THE INVENTION

Figure 1:
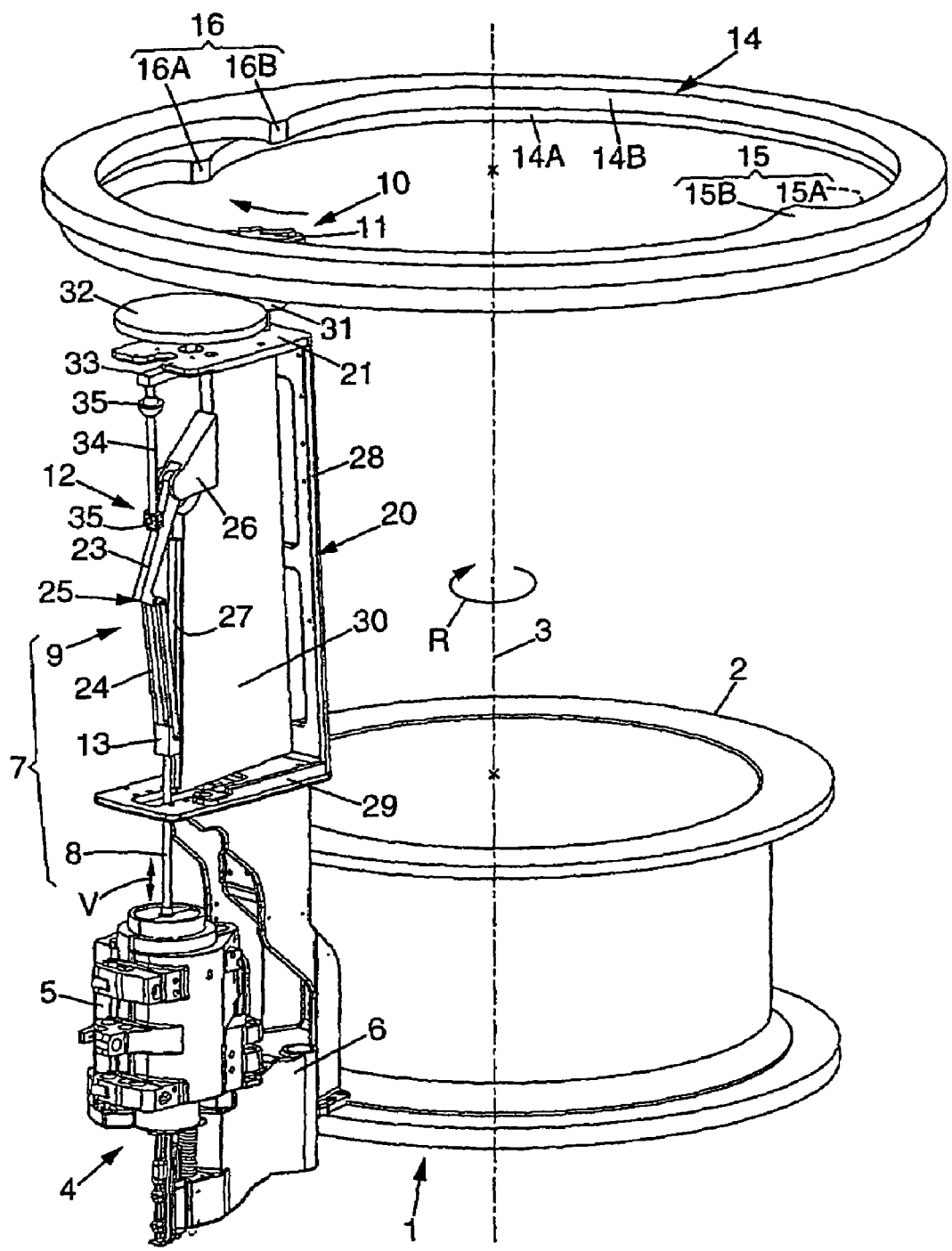
FIG. 1 is a partial perspective schematic view of a machine for molding containers by stretch-blow molding, which is arranged according to the invention.

By first referring to FIG. 1, a machine for producing thermoplastic containers by stretch-blow molding of preforms, of the type considered by the invention, comprises a turntable 1 (shown schematically by its central drum 2) rotating continuously and unidirectionally at constant speed (arrow R) about its axis 3.

The central drum 2 supports at least one molding device 4 (in practice a plurality of molding devices are distributed on the periphery of the drum). Each molding device 4 comprises an openable mold 5 (for example, as shown, a "billfold" or "jackknife" mold formed from two pivoting half-molds, optionally with a vertically moving bottom), said mold 5 being supported on the drum via a cradle 6.

To make the drawing more legible, the high pressure pneumatic blowing means—which can expand a heated thermoplastic preform into a molded container—which are not directly involved, from the technical standpoint, in the design of the means of the invention, are not shown in FIG. 1.

Mechanical stretching means 7 comprise a stretch rod 8 which is movable axially and vertically (double arrow V) and sequentially, to lower it into the mold 5 in order to mechanically stretch the hot preform axially in synchronism with the blow molding and to extract it from the mold once the container is molded.

The stretching means 7 further comprise supporting and drive means 9 of the stretch rod 8 according to the required movement and sequence, said means 9, according to the invention, being purely mechanical means as will now be explained.

Said supporting and drive means 9 of the stretch rod 8 comprise:

power takeoff means 10 which are functionally associated with the turntable 2 and which are able to generate, based on the continuous unidirectional rotation R of the turntable 2, two rotary movements of given angular amplitudes of a rocker 11, these movements occurring at two predetermined respective angular locations of the circular route of the turntable, and movement conversion means 12 able to convert the two abovementioned rotary movements of given angular amplitudes of the rocker 11 into two, respectively descending and ascending, opposed linear movements of a drive member 13 along a route substantially parallel to the axis of the mold 5, said drive member 13 being connected to the stretch rod 8.

Figure 2A:
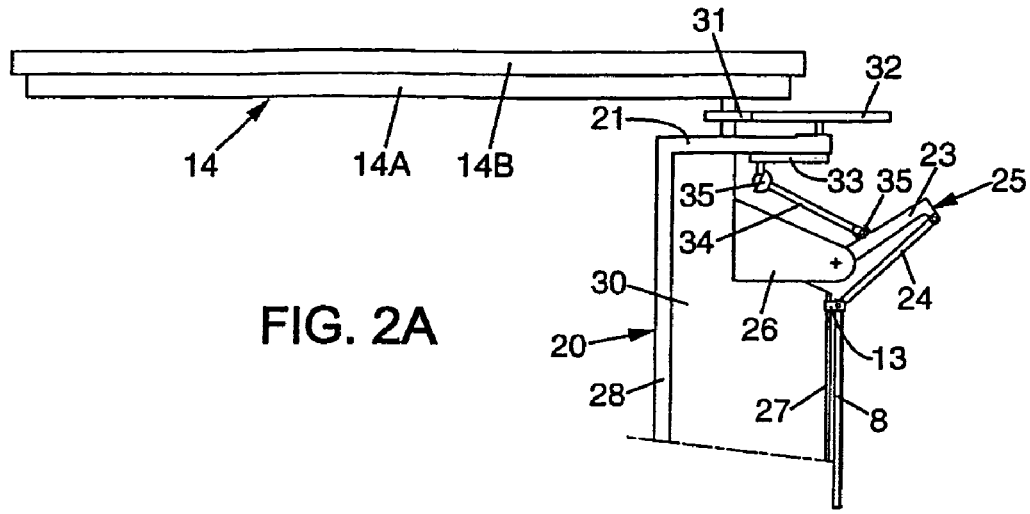
FIGS. 2A, 2B and 2C are at larger scale only showing the supporting and drive means of the stretch rod respectively in a side view, a perspective view and, for part of said means, in a plan view, said means being shown in a first functional position (stretch rod in high position outside the mold)
Figure 2B:
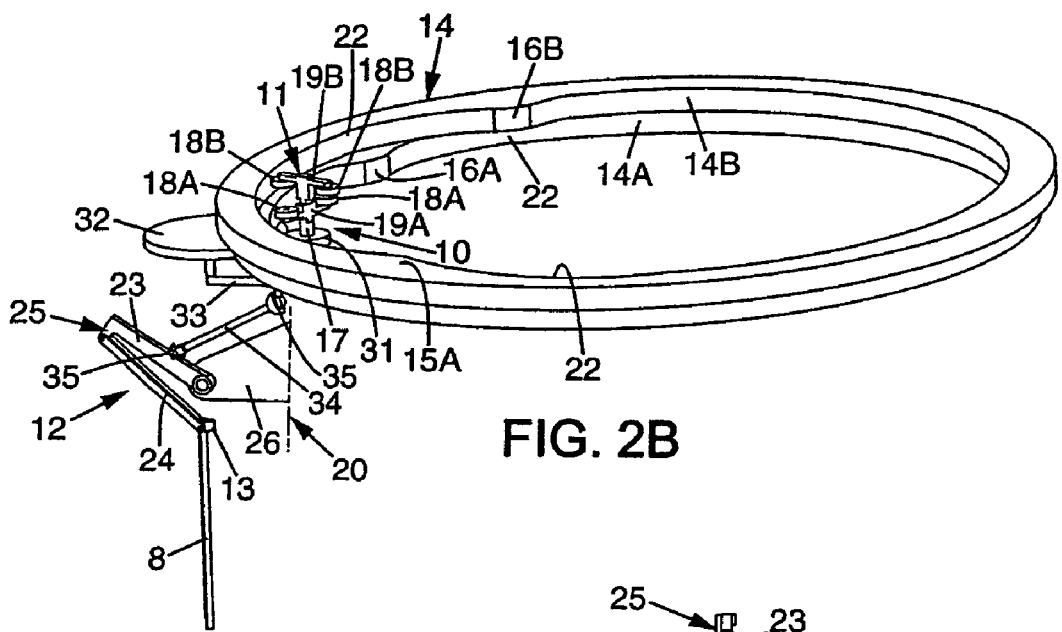
Figure 2C:
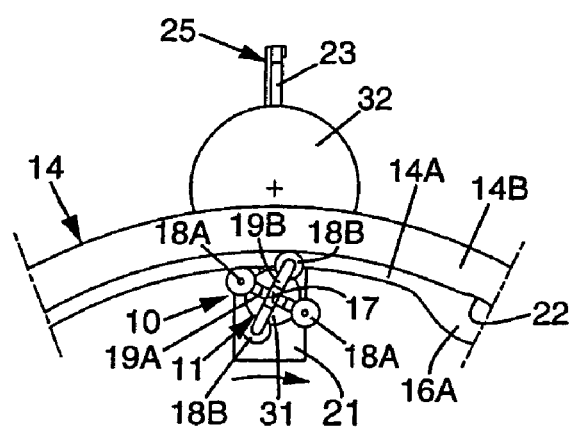

Preferred embodiments of the abovementioned drive means will now be described with more particular reference to FIG. 1 and also to FIGS. 2A to 2C which show these means in an isolated and clear manner respectively in a perspective view (FIG. 2A), a side view (FIG. 2B), and a partial plan view (FIG. 2C).

Firstly, as regards more particularly the power takeoff means 10, they can be constituted as follows.

Cam means 14 extending at least in an arc of circle are supported fixedly on the frame (not shown) of the machine and coaxially with the turntable. Preferably, the cam means 14 are circular as shown in the figures, this embodiment currently appearing to be the simplest to implement. These cam means 14 comprise at least two bosses, 15 and 16, angularly spaced from one another and located at respective predetermined locations for controlling the vertical movements, in one direction and in the other, of the stretch rod 8.

The abovementioned rocker 11 is a rocker with idler roller that is supported in a freely rotating manner about a vertical axis 17, by the turntable (for example, via a bracket or support column 20 which is integral with the drum 2 and which also supports all the abovementioned movement conversion means 12). The rocker 11 is thus driven along the cam means 14, the rocker 11 being able to be rotated over a predetermined angular range when the idler roller passes each boss 15, 16 of the cam means 14.

The angular distance between the abovementioned two predetermined locations of the turntable route, in other words, between the two bosses 15, 16, is determined according to the speed of rotation of the turntable and the precise sequence according to which the stretching phase is to be conducted, so that—one complete turn of the turntable corresponding to one complete cycle of the stretch-blow molding process including the loading of the preform and the unloading of the molded container—the passage of the rocker 11 first on the first boss 15, and then on the second boss 16 coincides, in the turntable rotation cycle, with the times when, in the container production cycle, the stretch rod 8 must first be lowered into the mold (stretching, in correspondence with the boss 15), and then raised outside the mold (end of blow molding, in correspondence with the boss 16), the blow molding process taking place in correspondence with the movement of the rocker 11 in the interval between the bosses 15 and 16.

It is advisable for the rotation undergone by the rocker 11 during its passage on each boss 15, 16 to extend over an extended angular range, particularly for example over about a half-turn.

For this purpose, in a preferred exemplary embodiment, the following arrangement can be provided.

The cam means 14 comprise two fixed circular and superimposed cams 14A, 14B, the numeral 14A denoting, for example, the lower cam and the numeral 14B denoting the upper cam. For their part, the two bosses 15, 16 also consist in duplicate form, that is, the boss 15 comprises a first boss 15A formed on the lower cam 14A followed (in the movement direction of the rocker 11) by a second boss 15B formed on the upper cam 14B; the boss 16, similarly comprises a first boss 16A on the cam 14A and a second boss 16B on the cam 14B. The angular distance between the two successive bosses 15A, 15B and the two successive bosses 16A and 16B is relatively small and just necessary to cause a double rotation of the rocker 11 which is arranged as follows.

The rocker 11 is equipped with two pairs of idler rollers respectively 18A and 18B which are vertically offset to each other in order to be located opposite the two cams 14A, 14B, respectively. More precisely, the rocker 11 comprises two arms 19A, 19B, integral with one another, arranged in a cross, offset to each other vertically, and supporting the pairs of rollers 18A and 18B respectively. The rocker 11 thus formed is idly supported, by its axis 17 coinciding with the intersection of the arms 19A, 19B, on a plate 21 integral with the column 20.

Hence the rocker is in the form of a freely pivoting carriage, which bears on the two cams 14A, 14B via two respective rollers 18A, 18B. Every time a roller 18A or 18B is positioned in front of a boss 15A, 16A or respectively 15B, 16B, the rocker rotates about its axis so that the roller opposite the same arm bears against the respective cam, the corresponding rotation of the rocker being a quarter of a turn. Thanks to the use of two successive bosses 15A, 15B, respectively 16A, 16B, the rocker 11 is caused to rotate, on each occasion, by a half-turn, as desired.

Although the design of the cam means 14 and hence also that of the rocker 11, can give rise to various embodiments, it is nevertheless advantageous for the two cams 14A, 14B to be made in the form of annular rings of which the inner face (that is in general the face forming a cylinder of revolution notwithstanding the presence of the abovementioned bosses) represents the rolling surface of the corresponding rollers of the rocker 11. Accordingly, the rocker 11 moves within the cylindrical space surrounded by the cams. The overall system thus has a minimum size. Furthermore, the centrifugal force applied to the moving rocker helps to maintain it in contact with the rolling surfaces of the cams 14A, 14B.

It should be observed that in this embodiment and as shown better in FIG. 2C, the pivot axis 17 of the rocker 11 moves along a circular route parallel to the rolling surfaces (to the exclusion of the bosses) of the cams 14A, 14B. When a roller bearing on a cam (for example, in FIG. 2C, the roller 18A bearing on the cam 14A) reaches a boss (for example 16A), the pivoting of the rocker 11 takes place with maintenance of the other roller bearing against the other cam (for example the roller 18B bearing against the cam 14B). However, the length of the half-arm 19B supporting said roller 18B is greater than the radial distance between the axis 17 and the surface of the cam 14B. To allow the unrestricted pivoting movement of the rocker, a recess 22 is therefore provided in each cam 14A, 14B, located opposite the boss provided on the other cam.

As regards the movement conversion means 12, various embodiments are feasible for converting the discontinuous unidirectional rotary movement of given angular amplitude (particularly over 180°) generated by the rocker 11 into a vertical linear reciprocating movement of the stretch rod 8. Structurally simple means capable of reliably withstanding the high production rates of the type of machines concerned can advantageously be formed as follows.

A caliper 25 is formed by two arms 23, 24 freely hinged in rotation with one another and arranged in a substantially vertical plane. The first arm 23 has its other end freely hinged in rotation on a fixed part of the turntable, for example on a bracket 26 integral with the abovementioned column 20. The second arm 24 has its other end hinged on the abovementioned drive member 13 formed as a slide moving freely on a vertical guide 27 (that is, parallel to the axis of the mold 5); the slide 13 supports the upper end of the stretch rod 8.

In the exemplary embodiment shown more clearly in FIG. 1, the bracket or column 20 is arranged with a back 28 in the shape of a vertical plate that, at the top, supports the abovementioned plate 21 and which is, at the bottom, integral with an underframe 29 for fixing it to the drum 2 of the turntable. The assembly of the column 20 accordingly has the general shape of a reclining U within which a stiffener plate 30 is attached, at the top of which the abovementioned bracket 26 is fixed. Under the bracket 26, the frontal edge of the stiffener plate 30 is arranged to constitute or to support the vertical guide 27 of the slide 13.

The arrangement of the column 20 just described serves to combine the advantage of a very good stiffness of the column—which, on the one hand, guarantees proper support of the rocker 11 on the cam means 14 and, on the other, the indeformability of the guide 27 necessary for the stretch rod 8 to travel correctly along the axis of the mold—with the advantage of an integration of certain components in the structure of the column 20, thereby providing a gain of space and of weight.

To convey the pivoting movement of the rocker 11, located internally in the cam means 14, to the caliper 25 and to the stretch rod 8 located outside said cam means 14, a gear transmission is provided, with a first gearwheel 13 coinciding with the axis 17 of the rocker 11 and hence integral therewith in rotation and gearing with a second gearwheel 32 supported in free rotation by the plate 21. The axis of the second gearwheel 32 rigidly supports a radial arm 33. This arm 33 is therefore actuated with a pivoting movement, controlled by the rocker 11, over an angular range determined by the gearing down ratio of the two gearwheels 31, 32. In the example more particularly shown in FIGS. 1 and 2A-2C, in which the rocker 11 pivots by a half-turn on the passage of each pair of bosses 15A, 15B and 16A, 16B, the gearing down ratio of the gearwheels 31, 32 is determined so that the end of the arm 33 makes a half-turn synchronized with the rocker 11 when the latter makes a half-turn.

A drive rod 34 is further inserted between the end of the arm 33 and an intermediate part of the arm 23 of the caliper 25, with which it is integral via links 35 with three degrees of rotational freedom (for example, ball joints and/or universal joints).

The arm 33 coincides with the axis of the second gearwheel 32 so as to extend approximately into the plane defined by the caliper 25 when the rocker 11 moves outside the bosses 15, 16 of the cam means 14. In this case, the rod 34 also extends into this plane.

The functioning of the mechanism just described clearly appears in the appended drawings.

In FIGS. 2A to 2C, the angular positioning of the rocker 11 along the cam means 14 is such that the arm 33 extends toward the axis 3 of rotation of the turntable. In this position, the end of the arm 33 has driven the rod 34, which, in its turn, has caused the raising of the arm 23 of the caliper 25 by rotation on the plate 26. The caliper 25 is thus in a closed conformation, with the slide 13 conveyed to the top of the guide 27. The stretch rod 8 is then in the raised position, outside the mold 5.

Figure 3A:
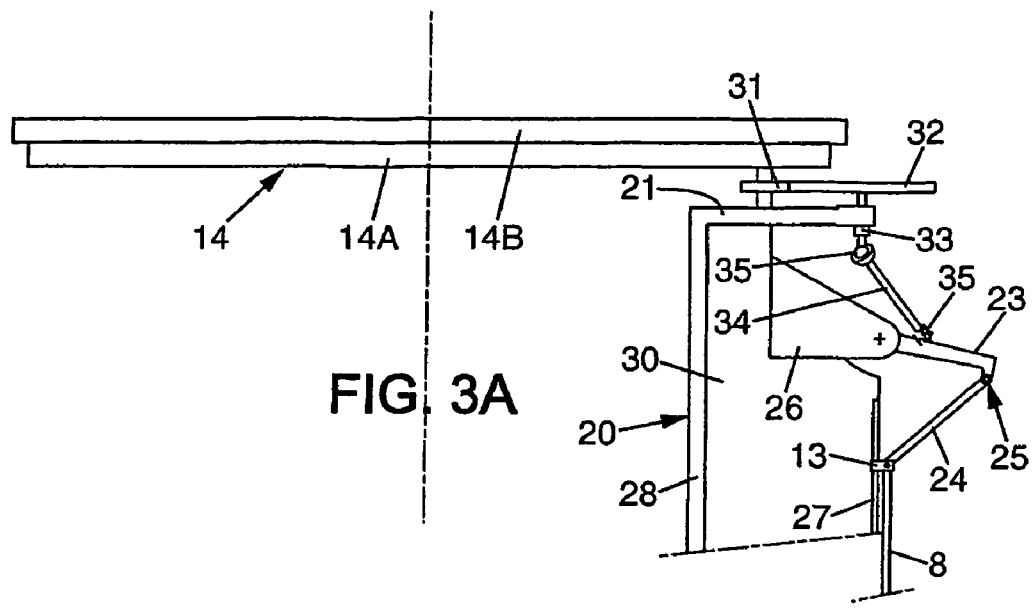
FIGS. 3A and 3B are views of the supporting and drive means of the stretch rod respectively in a side view and a front view, said means being shown in a second functional position (stretch rod in intermediate position, partially embedded in the mold)
Figure 3B:
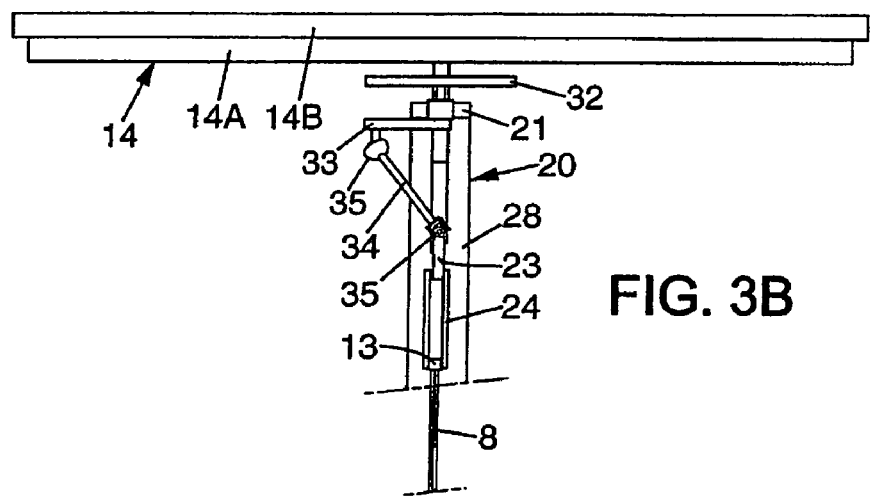

In FIGS. 3A and 3B, the rocker 11 is crossing a boss 15 or 16 and, more particularly, it is presumed to be at mid-pivot between the bosses 15A, 15B or respectively 16A, 16B. The arm 33 is then pivoted by 90° (FIG. 3B), the rod 34 is diagonally inclined and the slide 13 is at mid-distance of the guide 27. The stretch rod is half engaged in the mold 5.

Figure 4A:
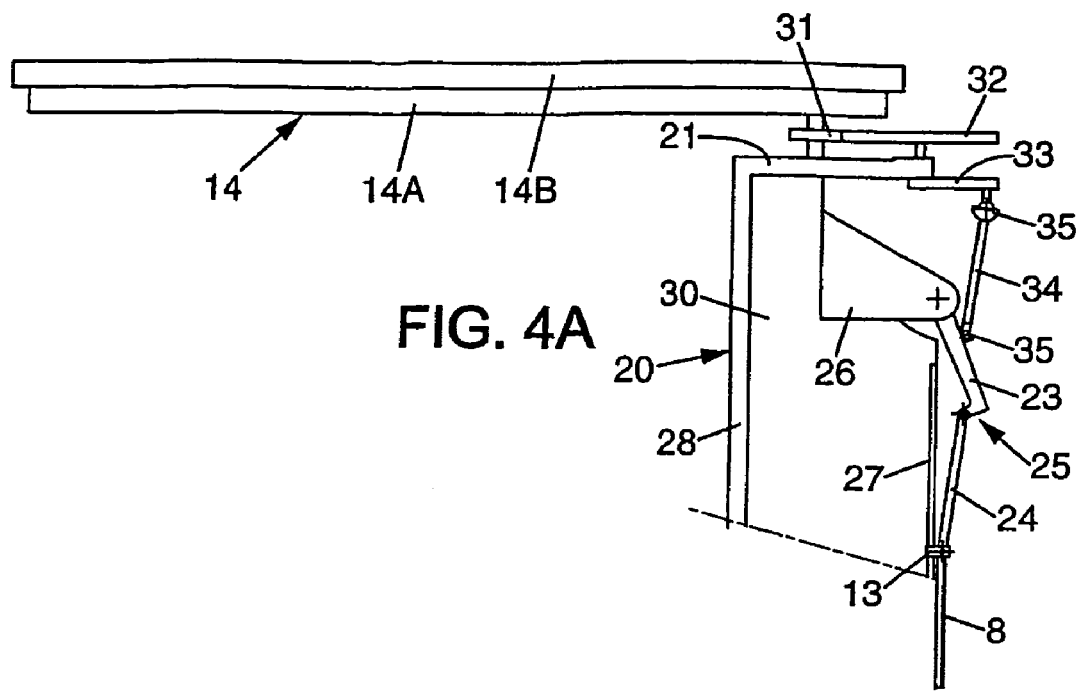
FIGS. 4A and 4B are views of the supporting and drive means of the stretch rod respectively in a side view and a perspective view, said means being shown in a third functional position (stretch rod in the low position, completely embedded in the mold, causing the complete stretching of a preform).
Figure 4B:
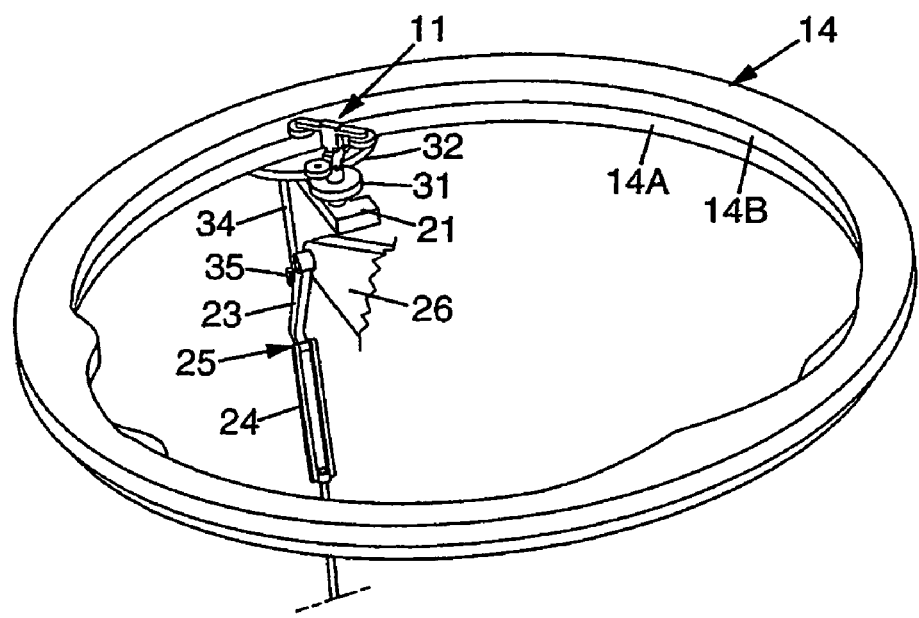

In FIGS. 4A and 4B, the rocker 11 has passed the previous boss 15 or 16 and has therefore completed its pivoting. The arm 23 is now rotated opposite the axis of the turntable so that the rod 34 pushes the arm 23 of the caliper 25 downward. The caliper 25 is thus opened to the maximum, the slide 13 being located at the bottom of the guide 27. The stretch rod 8 is then embedded to the maximum in the mold. This is the situation also shown in FIG. 1.

The invention claimed is:

1. A machine for producing containers made of a thermoplastic by stretching and blow molding preforms, this machine comprising a continuously rotating turntable supporting at least one molding device comprising an openable mold and a stretch rod which can be sequentially moved, by support and driving means, along the axis of the mold so as to stretch the preform during the container production operation, wherein said means for supporting and driving the stretch rod are mechanical means which comprise:

power takeoff means functionally associated with said turntable and able to generate, from the continuous unidirectional rotation of the turntable, two rotary movements of given angular amplitudes of a rocker occurring at two respective predetermined angular locations of the circular route of the turntable, and movement conversion means able to convert said two rotary movements of given angular amplitudes of the rocker into two alternately descending and ascending opposite linear movements of a drive member along a route substantially parallel to the axis of the mold, said drive member being connected to the stretch rod.

2. The machine as claimed in claim 1, wherein said power takeoff means comprise:

fixed cam means extending at least in a circular arc and coaxial with the turntable, having at least two bosses at the respective predetermined locations for controlling the movements of the stretch rod, and a rocker with at least one idler roller supported in a freely rotating manner about a vertical axis by the turntable and driven thereby along the cam means, the rocker being able to be rotated over a predetermined angular range when the idler roller passes each boss of the cam means.

3. The machine as claimed in claim 2, wherein:

the cam means comprise two superimposed fixed cams, these cams comprising, for said each predetermined location, two respective bosses arranged angularly offset to one another, and the rocker comprises two pairs of two idler rollers, vertically offset to one another for respectively cooperating with said two cams, this rocker comprising two arms in a cross integral with each other and supporting said rollers at their respective ends, the axis of rotation of the rocker coinciding with the intersection of said two arms, whereby, at each of said predetermined locations, the rocker, by passing over the two successive bosses of the cam means, rotates by 180°.

4. The machine as claimed in claim 2, wherein the fixed cam means are circular.

5. The machine as claimed in claim 3, wherein said cams comprise respective cam surfaces which are cylinders of revolution and coaxial with the axis of the turntable and in that the rocker is moved within the cylindrical space bounded by the cams.

6. The machine as claimed in claim 2, wherein said movement conversion means comprise:

a caliper formed from two arms hinged freely by one of their respective ends, these two arms being arranged in a substantially vertical plane, the first of these arms having its other end hinged freely at a fixed point of the turntable and the second of these arms having its other end hinged on a slide mounted on a guide parallel to the mold axis, said slide supporting said stretch rod, and a drive rod having a first of its ends made integral, via a rotary hinge with three degrees of freedom, with a rotary arm integral with the axis of the rocker and having its other end connected via a rotary hinge with three degrees of freedom to said first arm of said caliper.

* * * * *